US009529625B2

(12) United States Patent
Vrind et al.

(10) Patent No.: US 9,529,625 B2
(45) Date of Patent: Dec. 27, 2016

(54) METHOD AND SYSTEM FOR PROVIDING STACK MEMORY MANAGEMENT IN REAL-TIME OPERATING SYSTEMS

(71) Applicant: Samsung Electronics Co., Ltd., Gyeonggi-do (KR)

(72) Inventors: Tushar Vrind, Gyeonggi-do (KR); Balaji Somu Kandaswamy, Bangalore (IN); Raju Siddappa Udava, Bangalore (IN); Venkata Raju Indukuri, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/676,366

(22) Filed: Apr. 1, 2015

(65) Prior Publication Data

US 2015/0277977 A1  Oct. 1, 2015

Related U.S. Application Data

(60) Provisional application No. 61/973,629, filed on Apr. 1, 2014.

(30) Foreign Application Priority Data

Feb. 11, 2015  (KR) ........................ 10-2015-0021030

(51) Int. Cl.
G06F 9/46 (2006.01)
G06F 9/48 (2006.01)
G06F 9/50 (2006.01)

(52) U.S. Cl.
CPC ........... *G06F 9/4881* (2013.01); *G06F 9/5011* (2013.01)

(58) Field of Classification Search
None
See application file for complete search history.

(56) References Cited

U.S. PATENT DOCUMENTS 5,949,973 A    9/1999  Yarom

*Primary Examiner* — Gregory A Kessler
(74) *Attorney, Agent, or Firm* — The Farrell Law Firm, P.C.

(57) ABSTRACT

A method and system for providing memory management in a Real-Time Operating System (RTOS) based system are provided. The method includes creating a plurality of tasks with a two level stack scheme comprising a first level stack and a second level stack, scheduling a first task for execution by moving a stack pointer from the first level stack to the second level stack, determining whether the first task is pre-empted, allocating the second level stack to the first task in a second state if the first task is not pre-empted, changing an active task for execution, determining whether the first task relinquishes control from the second state and is waiting for a resource, moving the stack pointer back from the second level stack to the first level stack if the first task relinquishes itself and providing the second level stack for use by a second task.

13 Claims, 10 Drawing Sheets

METHOD AND SYSTEM FOR PROVIDING STACK MEMORY MANAGEMENT IN REAL-TIME OPERATING SYSTEMS

PRIORITY

This application claims priority under 35 U.S.C. §119(e) to a U.S. Provisional Patent Application filed on Apr. 1, 2014 and assigned Ser. No. 61/973,629, and to a Korean Patent Application filed on Feb. 11, 2015 in the Korean Intellectual Property Office and assigned serial No. 10-2015-0021030, the entire contents of each of which are incorporated herein by reference.

BACKGROUND

1. Field of the Disclosure

The present disclosure relates generally to stack management in a Real-Time Operating Systems (RTOS), and more particularly, to a method and system for reducing memory consumption in an RTOS-based system.

2. Description of the Related Art

An embedded RTOS-based system uses multiple tasks that are each associated with a stack as shown in FIG. 1. When there are a large number of tasks in a system, memory usage of the stack may be considerable. When a new task is added/created in the system, the memory requirements change as memory for the new task is allocated to the stack, which causes Random Access Memory (RAM) requirements to increase.

The following two cases are examples of possible stack usage in a system:

a. The allocated stack size for a particular task is set to a highest possible stack limit, even though the full allocated stack size is not necessarily always utilized by the particular task.

b. At any point of time, one task can be in a running state, while some other tasks may be in a ready (i.e., pre-empted) state, and all remaining tasks are in a suspended (i.e., waiting for an event/message) state.

In the above cases, the allocated stack memory for each task is not necessarily completely utilized at any given point in time. In a traditional RTOS, every task is expected to have a different stack area, and therefore, memory optimizations for stack usage are not possible. Even though certain operating systems apply a stack area reuse concept, it is difficult to apply stack reuse to a resource constraint low cost Machine-Type Communications (MTC) device. In some cases, stack memory can be reused when the task has existed for a certain period, and such a task might be deleted after execution of a specific task. But in a typical MTC device, tasks are created during boot-up time, and remain throughout the life of execution of the MTC device.

In a low-cost System on a Chip (SoC), such as one deployed in MTC devices, in order to bring down the cost of such chips, there is a need for a reduction in memory requirements, so that the MTC devices can function with a lower RAM configurations.

In view of the foregoing, there is a need for an effective scheme in an RTOS scheduler that lowers a memory footprint for task stack usage, allows RAM reduction on a task stack basis, while reducing the overall cost of devices.

SUMMARY

The present disclosure has been made to address the above-mentioned problems and disadvantages, and to provide at least the advantages described below.

An aspect of the present disclosure provides a method of providing memory management in a Real-Time Operating System (RTOS) based system.

According to an embodiment, a method of providing memory management in a Real-Time Operating System (RTOS) based system is provided. The method includes creating, by a task generator, a plurality of tasks with a two level stack scheme including a first level stack and a second level stack; scheduling, by a task scheduler, a first task for execution by moving a stack pointer from the first level stack to the second level stack; determining whether the first task is pre-empted; allocating the second level stack to the first task in a second state if the first task is not pre-empted; changing, by the task scheduler, an active task for execution; determining whether the first task relinquishes control from the second state and is waiting for a resource; moving the stack pointer back from the second level stack to the first level stack if the first task relinquishes itself; and providing the second level stack for use by a second task.

According to another embodiment, a method of providing memory management in an RTOS based system is provided. The method includes creating, by a task generator, a plurality of tasks with a two level stack scheme including a first level stack and a second level stack; scheduling, by a task scheduler, a first task for execution by transferring task contents associated with the first task from the first level stack to the second level stack; determining whether the first task is pre-empted; allocating the second level stack to the first task in a second state if the first task is not pre-empted; changing, by the task scheduler, an active task for execution; determining whether the first task relinquishes control from the second state and is waiting for a resource; scanning the second level stack if the first task relinquishes itself from the second state and is awaiting for the resource; determining whether a register is present in a range of stack addresses of the second level stack; determining whether the second level stack usage is less than a size of the first level stack, if no registers are present in the range of the stack addresses of the second level stack; and transferring the task contents from the second level stack to a corresponding first level stack.

According to another embodiment, a non-transitory computer-readable medium having instructions embedded thereon, wherein the instructions, when performed on a computer processor, execute a method of a Real-Time Operating System (RTOS) based system is provided. The method includes creating a plurality of tasks with a two level stack scheme including a first level stack and a second level stack; scheduling a first task for execution by moving a stack pointer from the first level stack to the second level stack; determining whether the first task is pre-empted; allocating the second level stack to the first task in a second state if the first task is not pre-empted; changing an active task for execution; determining whether the first task relinquishes control from the second state and is waiting for a resource; moving the stack pointer back from the second level stack to the first level stack if the first task relinquishes itself and awaits for another resource; and providing the second level stack for use by a second task.

According to another embodiment, a non-transitory computer-readable medium having instructions embedded thereon, wherein the instructions, when performed on a computer processor, execute a method of a Real-Time Operating System (RTOS) based system is provided. The method includes creating, by a task generator, a plurality of tasks with a two level stack scheme including a first level stack and a second level stack; scheduling, by a task scheduler, a first task for execution by transferring task contents associated with the first task from the first level stack to the second level stack; determining whether the first task is pre-empted; allocating the second level stack to the first task in a second state if the first task is not pre-empted; changing, by the task scheduler, an active task for execution; determining whether the first task relinquishes control from the second state and is waiting for a resource; scanning the second level stack if the first task relinquishes itself from the second state and is awaiting for the resource; determining whether a register is present in a range of stack addresses of the second level stack; determining whether the second level stack usage is less than a size of the first level stack, if no registers are present in the range of the stack addresses of the second level stack; and transferring the task contents from the second level stack to a corresponding first level stack.

According to another embodiment, a computer processor and memory running a Real-Time Operating System (RTOS) for the computer processor performing a first plurality of tasks including a first task and a second task are provided. The RTOS includes a task generator configured for creating a plurality of tasks with a two level stack scheme including a first level stack and a second level stack; and a task scheduler configured for scheduling a first task for execution by moving a stack pointer from the first level stack to the second level stack; determining whether the first task is pre-empted; allocating the second level stack to the first task in a second state if the first task is not pre-empted; changing an active task for execution; determining whether the first task relinquishes control from the second state and is waiting for a resource; moving the stack pointer back from the second level stack to the first level stack if the first task relinquishes itself and awaits for another resource; and providing the second level stack for use by a second task.

According to another embodiment, a computer processor and memory running a Real-Time Operating System (RTOS) for the computer processor performing a first plurality of tasks including a first task and a second task is provided. The RTOS includes a task generator configured to create a plurality of tasks with a two level stack scheme including a first level stack and a second level stack; and a task scheduler adapted scheduling a first task for execution by transferring task contents associated with the first task from the first level stack to the second level stack; determining whether the first task is pre-empted; allocating the second level stack to the first task in a second state if the first task is not pre-empted; changing an active task for execution; determining whether the first task relinquishes control from the second state and is waiting for a resource; scanning the second level stack if the first task relinquishes itself from the second state and is awaiting for the resource; determining whether any register any present in a range of stack addresses of the second level stack; determining whether the second level stack usage is less than a size of the first level stack if no registers are present in the range of the stack addresses of the second level stack; and transferring the task contents from the second level stack to a corresponding first level stack.

BRIEF DESCRIPTION OF THE DRAWINGS

The above and other objects, features, and advantages of the present disclosure will be more apparent from the following description, taken in conjunction with the accompanying, drawings in which.

DETAILED DESCRIPTION

Figure 1:
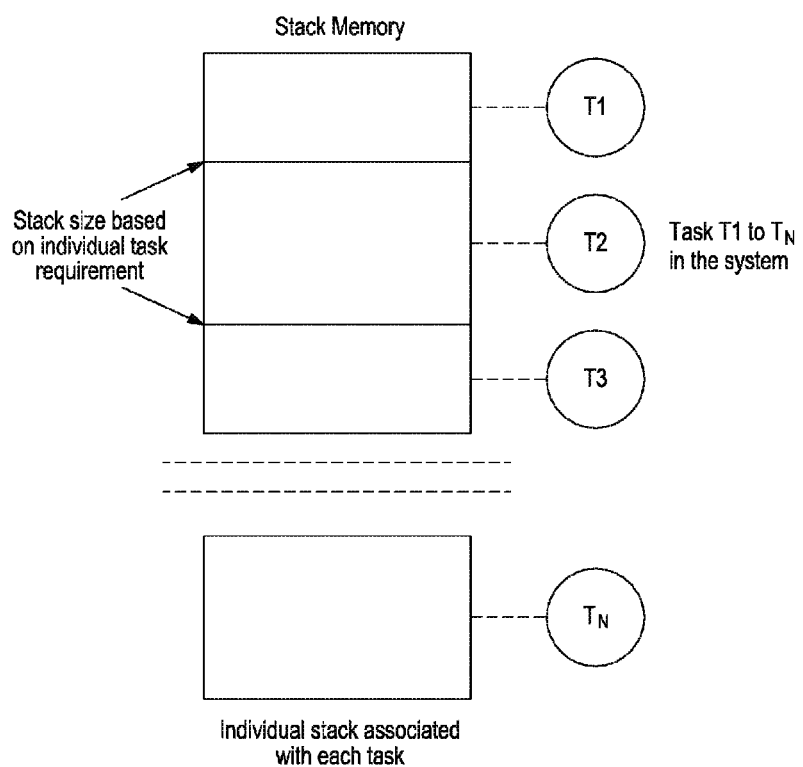
FIG. 1 is schematic diagram illustrating an individual task stack allocation in a multi-tasking scenario.

Hereinafter, embodiments of the present disclosure are described in detail with reference to the accompanying drawings. However, the present disclosure is not limited to the described embodiments. In the following description, the same or similar reference numerals are used to indicate the same or similar components in the accompanying drawings. Detailed descriptions of known functions and configurations may be omitted in order to avoid obscuring the subject matter of the present disclosure.

Some embodiments herein refer to a system and method for stack memory reduction, relocation and reuse for a low cost modem SoC. Certain embodiments of the present disclosure reduce memory consumption in embedded RTOS based systems, such as MTC devices where a modem SoC needs to deploy design techniques at all levels to reduce memory consumption.

Figure 2:
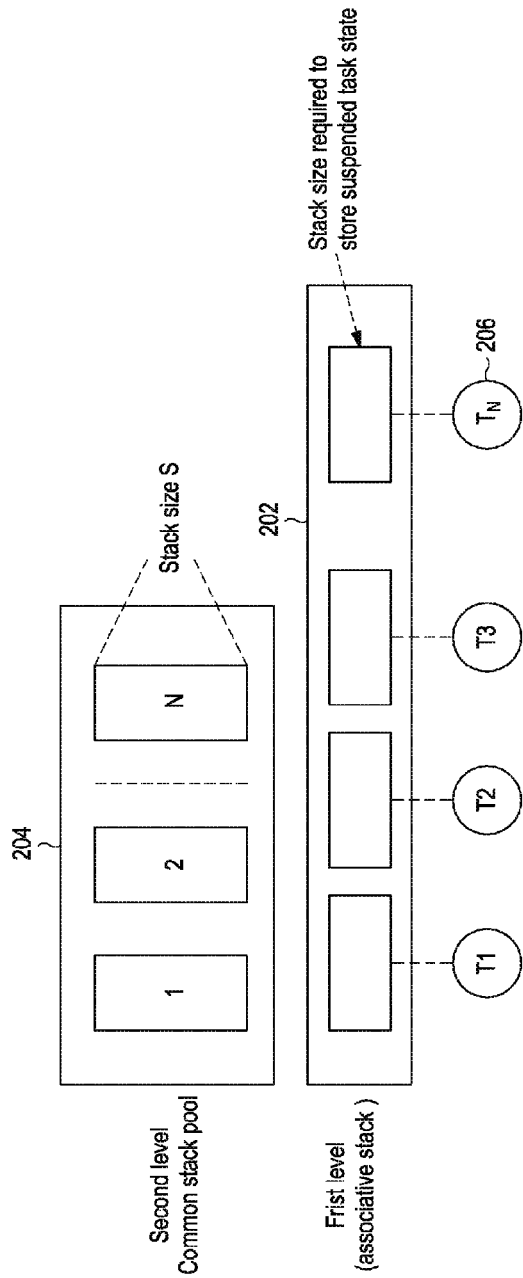
FIG. 2 is schematic diagram illustrating a two-level scheme for stack management for tasks, according to an embodiment of the present disclosure.

FIG. 2 is schematic diagram illustrating a two-level scheme for stack management of tasks according to an embodiment of the present disclosure.

Referring to FIG. 2, according to an embodiment of the present disclosure, a stack management framework uses two levels of stacks in order to reduce a memory footprint. The first level stack 202 is associated with each task (T1-TN) 206. In contrast to existing systems, the memory size is reduced to a bare minimum. The first level stack 202 holds context or data that is required to be in a suspended state (i.e. waiting for a synchronization event, queue, semaphore, etc.). As the suspended stack is not going to be scheduled for execution, the task local data can be stored in the limited first level stack 202. Hence the size of first level stack memory will be equivalent to the stack memory required to store the context of each corresponding task when it is in suspended state. This memory requirement is very small (i.e., a few words for register contexts, etc.). In some RTOS implementations, which allow running to completion, the size of the stack memory of the first level stack 202 could be as small as zero. The second level of stack 204 is a common memory pool, which includes a number N of common stacks each having a size S. The values of N and S each depend on a system implementation. The number of stacks N in the second level common stack pool 204 is decided based on a maximum number of possible ready tasks (i.e., preempted tasks) measurable in the system with a slight deviation. If the number of ready tasks is more than N (such as due to an unanticipated scenario), the second level stack 204 can be created dynamically from a heap. The common pool stack size S for all N stacks is maintained as the stack size required for a particular task to execute any particular scenario that demands a largest stack in the system.

Figure 3:
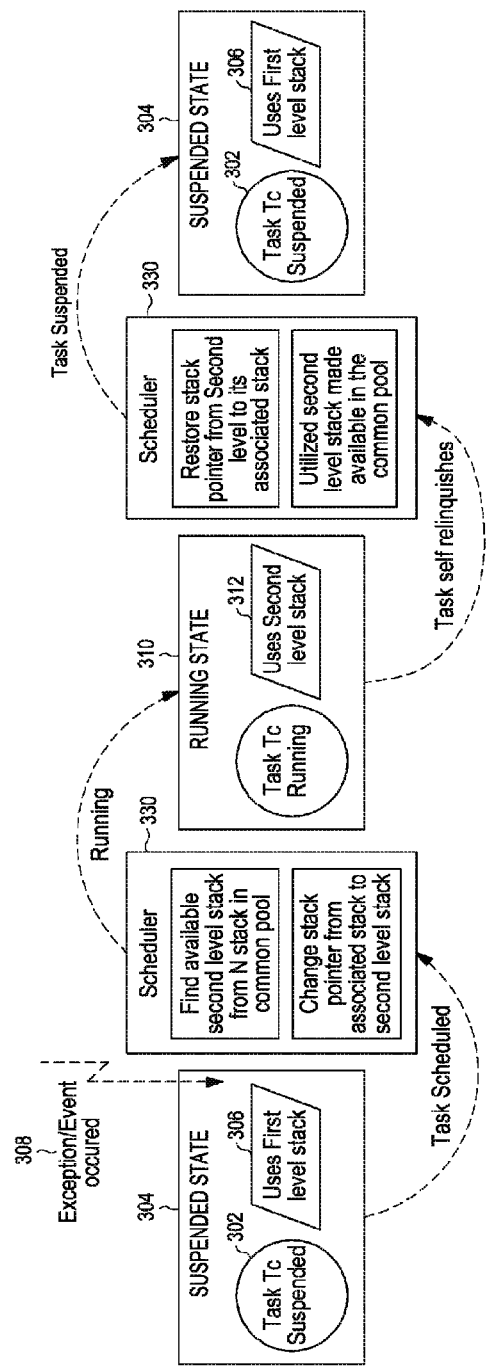
FIG. 3 is schematic diagram illustrating a process of switching task stacks in run time, according to an embodiment of the present disclosure.

FIG. 3 is schematic diagram illustrating a process of switching task stacks in run time, according to an embodiment herein.

Referring to FIG. 3, a process according to an embodiment of the present disclosure begins with a scenario in which a number of tasks are in a suspended state and have used an associated first level stack. A particular task Tc 302 in suspended state 304 using an associated first level stack 306, has now become ready to execute due to an exception or an event 308. The task is scheduled to be executed by a scheduler 330 before the task Tc 302 is moved from the suspended state 304 to a running state 310, a second level stack 312 is chosen to be a second level stack from among N stacks in a common pool. The stack pointer of the particular task Tc 302 is moved to the second level stack 312, where the stack pointer is reserved for use of the particular task Tc 302 until the task relinquishes itself. When task Tc 302 completes its process and relinquishes itself to be in a suspended state 304, the scheduler 330 returns the stack pointer to its associated first level stack 306, and updates the context in the same associated first level stack 306. The utilized second level stack 312 is made available in the common pool.

Figure 4:
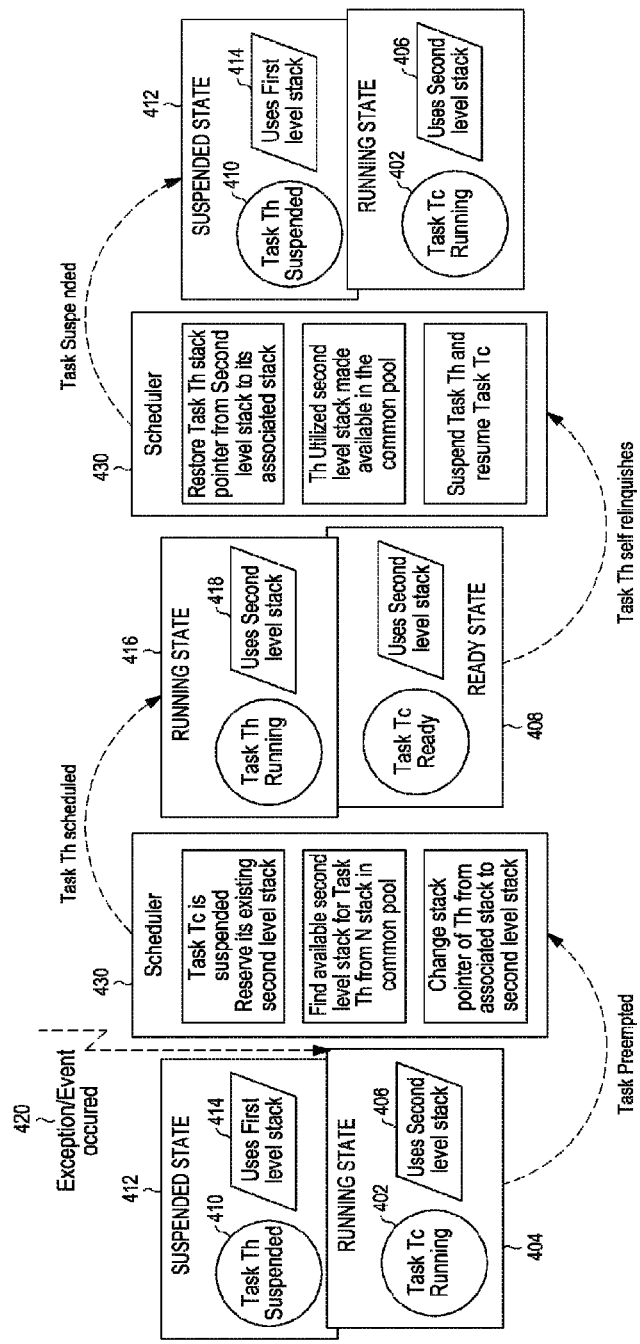
FIG. 4 is schematic diagram illustrating the usage of a task stack in a case of preemption, according to an embodiment of the present disclosure.

FIG. 4 is schematic diagram illustrating the usage of a task stack in a case of preemption, according to an embodiment of the present disclosure.

Referring to FIG. 4, a process according to an embodiment of the present disclosure begins in a scenario in which a task Tc 402 is in a running state 404 using a second level stack 406. Meanwhile, a task Th 410 is in a suspended state 412 using an associated first level stack 414. When the exception handler posts the higher priority task Th 410 to execute, the task Tc 402 is pre-empted due to an exception 420. In this condition, the second level stack 406 in the common pool is reserved for the executing task Tc 402 with the stack pointer in place, because the stack may be used by task Tc for holding local variables, some of which may be pointers to the same stack area. Therefore, the stack pointer cannot be changed in a statically linked code base implementation. The new task Th 410, which must be executed, must be assigned with next available second level stack 418 from the common pool. For this assignment, the stack pointer of the task Th 410, which is currently pointing to its associated first level stack 414, is updated with next second level stack 418 from the pool. The scheduler 430 then puts the task Th 410 in a running state 416 and keeps the previously running task Tc 402 in a ready state 408. When the task Th 410 self-relinquishes, the stack point for task Th 410 is restored from the second level stack 418 to its associated first level stack 414 and the utilized second level stack 418 is made available in the common pool. The task Tc 402 resumes in running state 404 using the second level stack 406.

According to an embodiment of the present disclosure, many pre-emptions are possible by using the above-described method. Further, when the pre-empted task relinquishes itself, the stack pointer is restored to its associated first level stack, and the second level stack used by the relinquished task is released to become available.

Figure 5:
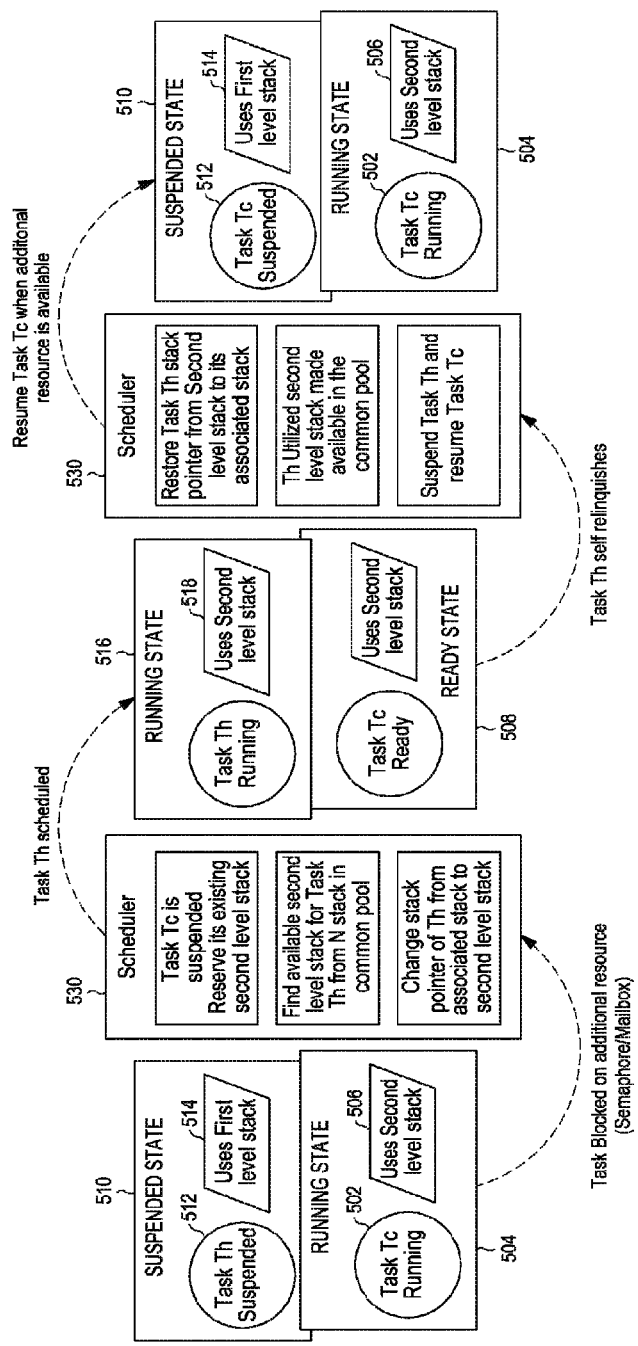
FIG. 5 is schematic diagram illustrating the usage of a task stack in a case of a task waiting for an additional resource, according to an embodiment of the present disclosure.

FIG. 5 is schematic diagram illustrating the usage of a task stack when a task waiting for an additional resource, according to an embodiment of the present disclosure.

Referring to FIG. 5, a process according to an embodiment of the present disclosure starts with a scenario in which a task Tc 502 is in a running state 504 using a second level stack 506. The task Tc 502 has to additionally wait for another resource (other than the normal wait) and relinquish used of the processor. Meanwhile, a new task Th 510 is in a suspended state 512 using an associated first level stack 514. When the new task Th 510 must be executed, the task Tc 502 is blocked from using additional resources. In this condition, the second level stack 506 in the common pool is reserved for the executing task Tc 502 with the stack pointer in place, because the second level stack 506 could be used by task the Tc 502 for holding local variables, some of which could be pointers to the same stack area. Therefore, the stack pointer cannot be changed in a statically linked code base implementation. The new task Th 510, which must be executed, must be assigned with a next available second level stack 518 from the common pool. For this assignment, the stack pointer of the task Th 510, which is currently pointing to its associated first level stack 514, is updated with the next available second level stack 518 from the pool. The scheduler 530 then puts the task Th 510 in running state 516 and keeps the previously running task Tc 502 in ready state 508. When the task Th 510 self-relinquishes, scheduler 530 restores the stack pointer of task Th 510 from the second level stack 518 to its associated first level stack 514, and the utilized second level stack 518 is made available in the common pool. The task Tc 502 resumes in the running state 504 using the second level stack 506 when additional resources become available.

According to an embodiment of the present disclosure, prerequisites associated with the second-level common pool stack are as listed below:

1. Any task, when scheduled to operate in a running state, can use any one of the available second level stacks. The stack utilization boundary is different for all of the tasks in the system, and also varies with respect to execution scenarios. Therefore, the common pool stack (second level stack) size S for all N stacks is maintained as a stack size required for a particular task to execute any scenario that demands the largest stack size in the system.

2. The number of stacks N in common pool can be decided based on the maximum number of possible ready tasks (i.e., pre-empted tasks) measurable in the system, with a slight deviation. If the number of ready tasks is greater than N, due to an unanticipated scenario, the stack can be created dynamically from a heap. However, the case in which the stack is created dynamically from the heap is an exceptional case, and the possible number of ready tasks in a system can be measured with some deviation.

Figure 6:
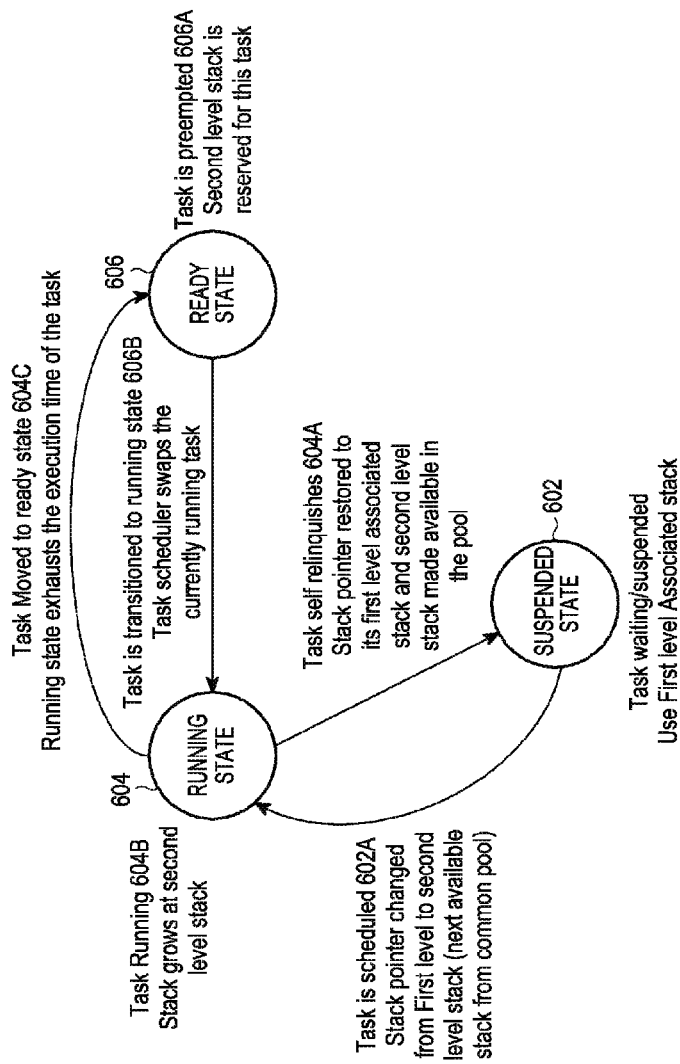
FIG. 6 is a task state diagram illustrating task states according to an embodiment of the present disclosure.

FIG. 6 is schematic diagram illustrating task states according to an embodiment of the present disclosure.

Referring to FIG. 6, according to an embodiment of the present disclosure, operations performed by a scheduler (not shown) during different task states are summarized as follows. At a running state 602, the stack grows at a second level stack 604B. At a ready state 606, when a task is pre-empted, second level stack is reserved for the pre-empted task. At a suspended state 606, the task is in waiting/suspended state and uses an associated first level stack 602B. When the task is in the running state 604 and the task self-relinquishes, as shown at reference numeral 604A, the stack pointer is restored to its associated first level stack and the second level stack is made available in the common pool, When the task is in the suspended state 602 and task is scheduled as shown at reference numeral 602A, stack pointer is changed from associated first level stack to the second level stack (next available stack from common pool). When the task is in running state 602, the running state exhausts the execution time, then the running state is suspended and the task is moved to the ready state at 602C. When the task is in ready state 606, a dispatch may occur at the same time as the task goes to ready state and the task makes an immediate transition to the running state at 606B. The Ready state 606 can only become running state 604, and this happens when the task scheduler needs to swap out the currently running task.

Figure 7:
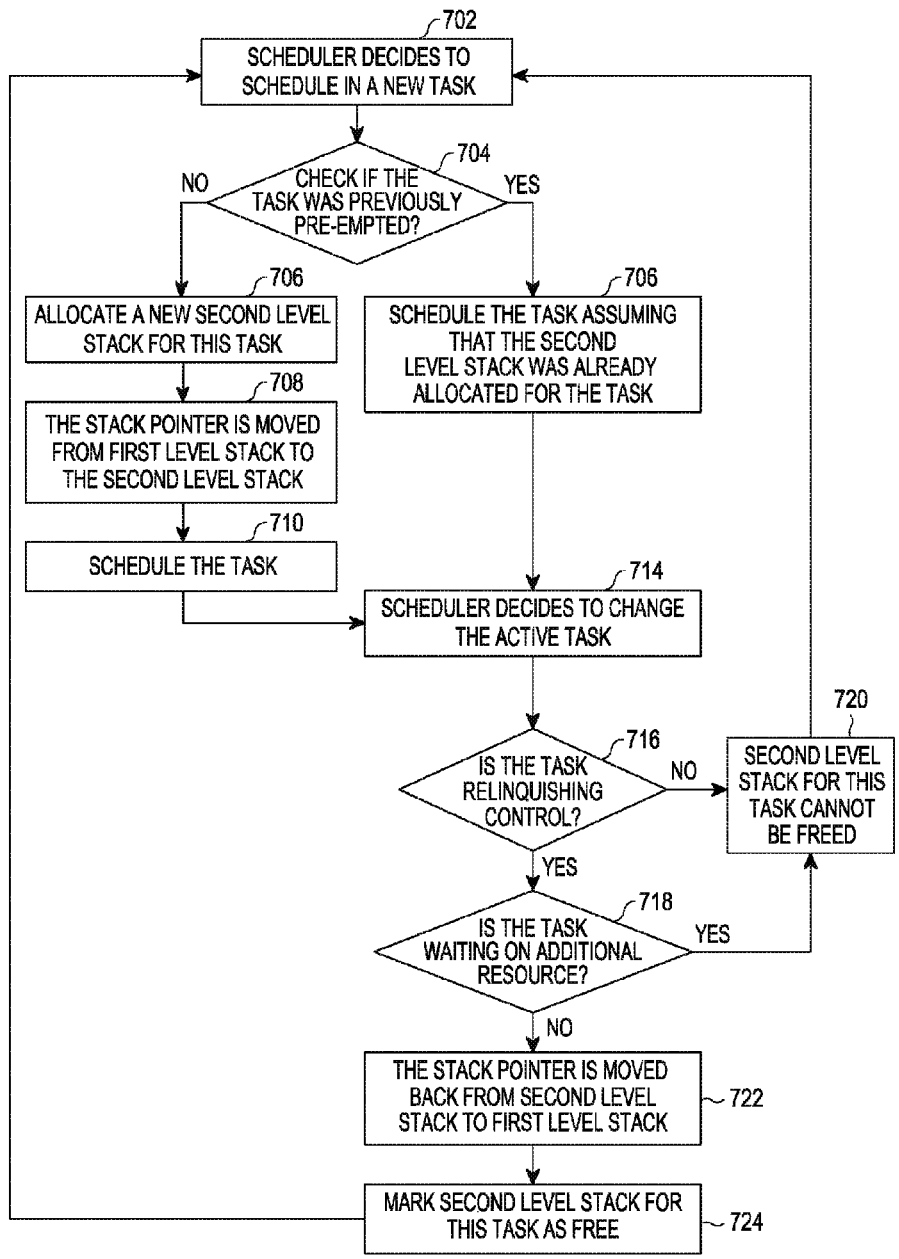
FIG. 7 is a flow diagram illustrating a method of providing scheduler control for a stack reuse mechanism, according to an embodiment of the present disclosure.

FIG. 7 is a flow diagram illustrating a method of providing scheduler control for a stack reuse mechanism, according to an embodiment of the present disclosure.

Referring to FIG. 7, in a method according to an embodiment of the present disclosure, tasks are created with a two level stack scheme, including a first stack level and a second stack level. The first stack level is dedicated on a per task basis and is adapted for holding a context frame of a task. The second stack level is a pool of task stacks, such that one of these task stacks will be assigned to a task in running state. At step 702, a first task for execution is scheduled by a task scheduler, by moving a stack pointer from the first level stack to the second level stack. At step 704, a determination of whether the first task was previously pre-empted is performed. If the first task was not pre-empted, then at step 706, a new second level stack for the first task is allocated in a running state to store the task content. The first level stack is configured to hold context data associated with the first task in a suspended state. When the first task, which is in the suspended state is scheduled to be executed, at step 708, the stack pointer is moved from first level stack to the second level stack, after which, at step 710, the first task is scheduled for execution.

If, at step 704, it is determined that the first task is pre-empted, then, at step 712, the first task is scheduled for execution, assuming that the second level stack was previously allocated for the first task.

At step 714, the scheduler decides to change the active first task and schedule a second task for execution. At step 716, a determination of whether the first task is relinquishing control is performed. If, at step 716, it is determined that the first task is relinquishing control, then at step 718, a determination of whether the first task is waiting for an additional resource is performed. If, at step 716, it is determined that the first task is not relinquishing control and it is determined that the first task is waiting for an additional resource at step 718, then the second level stack for the first task is not freed, at step 720. If, at step 718, it is determined that the first task is not waiting for an additional resource, then, at step 722, the stack pointer is moved from the second level stack back to first level stack. Further at step 724, the second level stack for the first task is marked as free. Regardless of whether the second level stack for the first task is freed, the scheduler schedules the second task for execution.

Figure 8A:
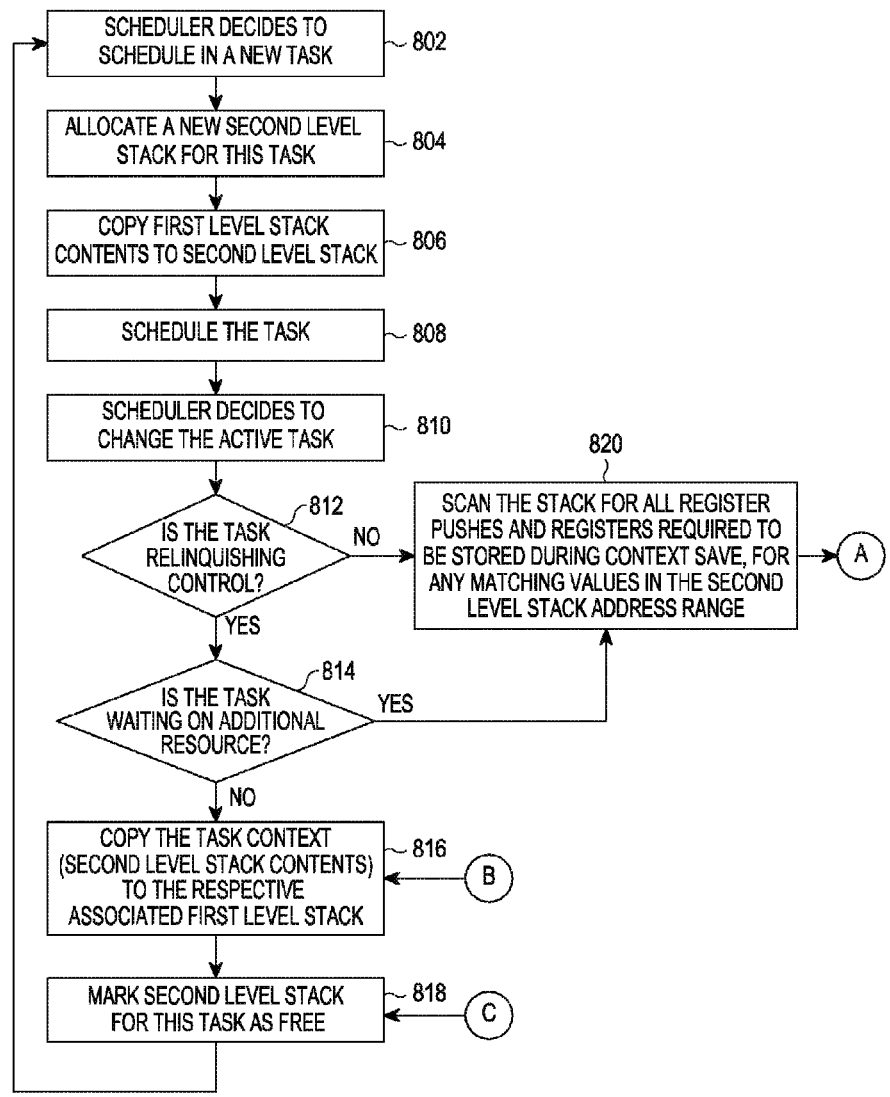
FIGS. 8A and 8B are a flow diagram illustrating a method of providing scheduler control for a stack reuse mechanism, according to an embodiment of the present disclosure.
Figure 8B:
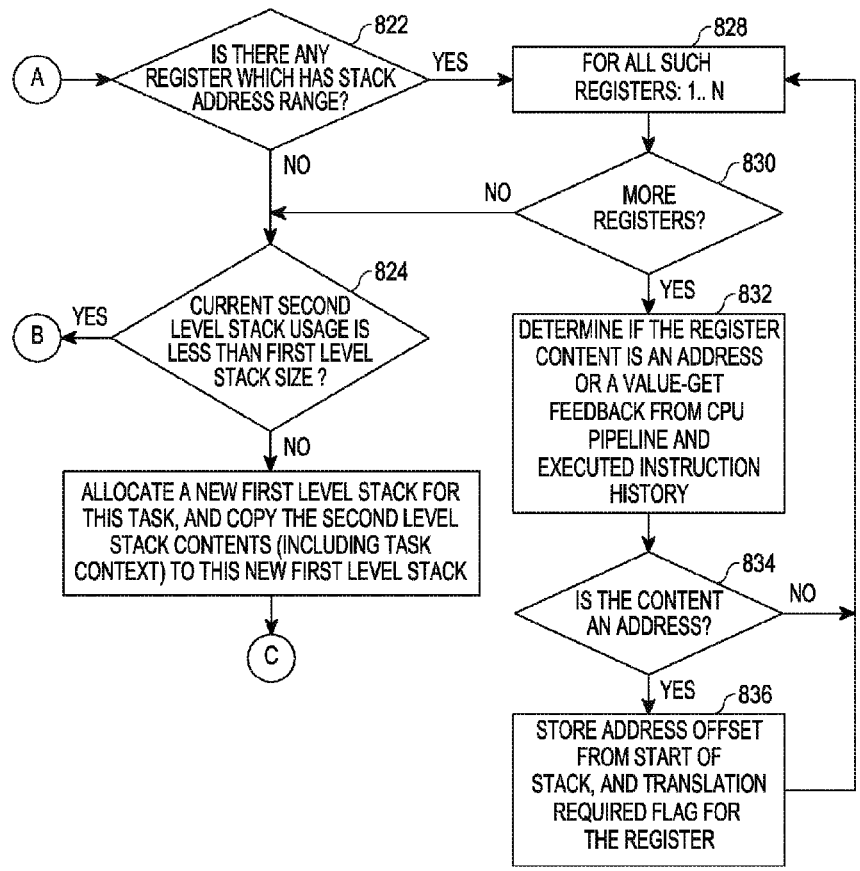

FIGS. 8A and 8B are a flow diagram illustrating a method of providing scheduler control for a stack reuse mechanism, according to an embodiment of the present disclosure.

Referring to FIGS. 8A and 8B, at step 802, a task scheduler schedules a first task for execution by transferring the task contents associated with the first task from the first level stack to the second level stack. At step 804, a new second level stack is allotted for the first task in running state, in order to store the task content. The first level stack is configured to hold context data associated with the first task in suspended state. When the first task, which is in suspended state is scheduled to be executed, at step 806, the stack pointer is moved from first level stack to the second level stack, after which, at step 808, the first task is scheduled for execution.

At step 810, the scheduler determines to change the active first task and schedules a second task for execution. At step 812, a determination of whether the first task is relinquishing control is performed. If, as step 812, it is determined that the first task is relinquishing control and if, at step 814, it is determined that the first task is not waiting for an additional resource, then at step 818, the second level stack for first task can be marked as free. Before the second level stack for the first task is marked as free in step 818, the task context (i.e., the second level stack contents) is copied to the respective associated first level stack, at step 816.

If, at step 812, it is determined that the first task is not relinquishing control, and if, at step 814, it is determined that the first task is waiting for an additional resource, then at step 820, the second level stack is scanned for all register pushes and registers required during context save, for any matching values in the second level stack address range. At step 822, a determination of whether there are any registers preset in the range of the second level stack addresses. If, at step 822, it is determined that no registers are present in the range of the stack address, then at step 824, a determination of whether the second level stack usage is less than a size of the first level stack is performed. If second level stack usage size is less than that of first level stack, then, at step 816, the second level stack contents (including task context) is copied to the respective associated first level stack. If the second level stack usage size is at least equal to that of the first level stack, at step 826, a new first level stack for the task is allocated, the second level Stack contents (including task context) are copied to this new first level stack, and the second level stack for the first task is marked as free.

At step 822, a determination of whether registers are present in the range of the stack address is performed. If, at step 822, it is determined that registers are present in the range of the stack address, then at step 828, store offset address and translation flag for each of the registers 1 . . . N. Further at step 830, a check for one or more registers is performed. At step 832, a determining if the register content is an address or a value and feedback is obtained from a Central Processing Unit (CPU) Pipeline and executed instruction history. If the register content is determined to be an address in step 834, then at step 836, the address offset from start of stack and a translation required flag for the register are stored.

Certain embodiments described herein provide a huge reduction in stack size, increases a Zero Initialized (ZI) area that can be used to increase a heap section, support multi-threaded preemptive kernels, and reduce costs due to less memory management. A zero initialized area is a section of the heap section or stack, where a value 0 will be stored in the reserved memory. Further, the value 0 will be replaced with a data value corresponding to an incoming data.

According to an embodiment of the present disclosure, whenever a task Tc is ready to be scheduled, all of the registers will be scanned, and registers holding addresses of a second level stack area, will be analyzed with instructions in a CPU Pipeline and will be actually holding an address or data. When it is determined that the second level stack contains a stack address, where the stack address needs to be translated to a new stack area when the task is relocated to a new second level stack memory area in future scheduling.

In addition, the whole second level stack must be scanned for any additional register pushes in the current call stack, for the second level stack may also contain a stack address and need a translation. This translation, however, requires additional knowledge of an execution history of instructions in the CPU.

One such way to obtain this additional required knowledge would be to save for that register, the 'offset' from the stack start, and a 'translation-required' flag for that register. This information could also be overwritten in the same register's backup on the stack to save space.

During a reschedule, the saved information will be decoded, and a register is restored with a new address to the new second level stack area.

Figure 9:
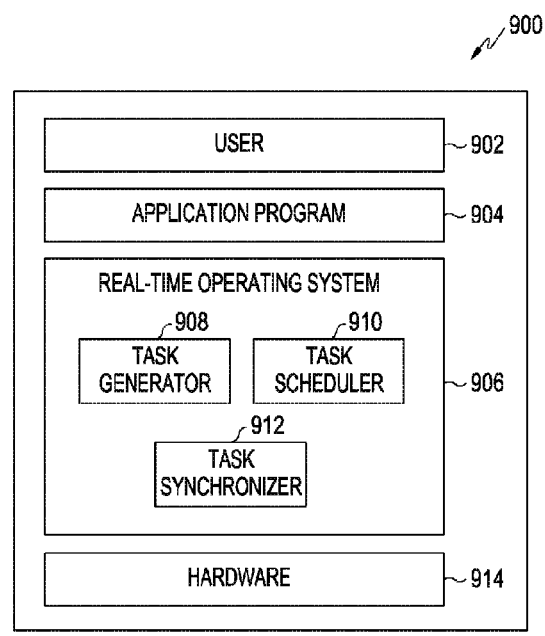
FIG. 9 is a block diagram illustrating a computing environment illustrating the various functional components of a Real-Time Operating System, according to an embodiment of the present disclosure.

FIG. 9 is a block diagram illustrating a computing environment illustrating the various functional components of a Real-Time Operating System, according to an embodiment of the present disclosure. Referring to the block diagram of FIG. 9, the computing environment includes a User Interface Layer 902, an application program layer 904, an RTOS system 906 and an underlying device hardware 914.

The RTOS system 906 includes a task generator 908, a task scheduler 910 and a task synchronizer 912. The task generator 908 is adapted to create a plurality of tasks with a two-level stack scheme. The two-level stack scheme includes a first level stack and a second level stack. The task scheduler 910 is adapted for scheduling a first task for execution by moving a stack pointer from the first level stack to the second level stack, determining whether the first task is pre-empted or not, allocating the second level stack to the first task in a second state if the first task is not pre-empted, changing, by the task scheduler, an active task for execution, and determining whether the first task relinquishes control from the second state and is waiting for a resource. The task synchronizer 912 is adapted to move the stack pointer back from the second level stack to the first level stack if the first task relinquishes itself and provide the second level stack for use by a second task.

The specification may refer to "an", "one" or "some" embodiment(s) in various locations. This usage does not necessarily imply that each such reference is to the same embodiment(s) of the present disclosure, or that the feature only applies to a single embodiment of the present disclosure. Single features of different embodiments may also be combined to provide other embodiments of the present disclosure.

As used herein, the singular forms "a", "an" and "the" are intended to include the plural forms as well, unless expressly stated otherwise. The terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. When an element is referred to as being "connected" or "coupled" to another element, such an element can be directly connected or coupled to the other element, or intervening elements may be present. Furthermore, "connected" or "coupled" elements as used herein may include operatively connected or coupled elements. As used herein, the term "and/or" includes any and all combinations and arrangements of one or more of the associated listed items.

Unless otherwise defined, all terms (including technical and scientific terms) used herein have the commonly understood meanings, as commonly understood by one of ordinary skill in the art to which this description pertains. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Although, the present disclosure has been shown and described with reference to specific embodiments, various modifications and changes may be made to these embodiments without departing from the broader spirit and scope of the present disclosure, as defined by the appended claims and their equivalents.

What is claimed is:

1. A method of providing memory management in a Real-Time Operating System (RTOS) based system, the method comprising:
    creating, by a task generator, a plurality of tasks with a two level stack scheme including a first-level stack and a second-level stack;
    scheduling, by a task scheduler, a first task for execution by moving a stack pointer from the first-level stack to the second-level stack;
    determining whether the first task is pre-empted;
    allocating the second-level stack to the first task in a second state if the first task is not pre-empted;
    changing, by the task scheduler, an active task for execution;
    determining whether the first task relinquishes control from the second state and is waiting for a resource;
    moving the stack pointer back from the second-level stack to the first-level stack if the first task relinquishes itself; and
    providing the second-level stack for use by a second task.

2. The method of claim 1, wherein scheduling the first task comprises:
    determining that the second-level stack was previously allocated for the first task, if the first task is pre-empted; and
    scheduling the first task for execution.

3. The method of claim 1, wherein the first-level stack is configured to hold a context data associated with the first task in the first state.

4. The method of claim 1, wherein the second-level stack includes a plurality of stacks, where at least one stack of the plurality of stacks is provided to store the task content when the first task shifts from the first state to the second state.

5. The method of claim 1, wherein the first state associated with the first task is a suspended state.

6. The method of claim 1, wherein the second state associated with the first task is a running state.

7. The method of claim 1, wherein a size of the first-level stack is equivalent to a stack memory required to store a content of the first task in a suspended state.

8. The method of claim 1, wherein, a size of the second-level stack is determined based on a stack required for any task to execute any scenario that demands a largest stack in the RTOS based system.

9. The method of claim 1, wherein a number of stacks in the second-level stack is determined based on a maximum number of pre-empted tasks.

10. The method of claim 1, wherein the stack pointer is moved to the second-level stack before a first task is moved from one state to another state.

11. The method of claim 1, further comprising:
creating, by the task scheduler, at least one stack in the second-level stack, if a number of pre-empted tasks for execution is greater than a pre-defined number.

12. A non-transitory computer-readable medium having instructions embedded thereon, wherein the instructions, when performed on a computer processor, execute a method of a Real-Time Operating System (RTOS) based system, the method comprising:
creating a plurality of tasks with a two level stack scheme including a first-level stack and a second-level stack;
scheduling a first task for execution by moving a stack pointer from the first-level stack to the second-level stack;
determining whether the first task is pre-empted;
allocating the second-level stack to the first task in a second state if the first task is not pre-empted;
changing an active task for execution;
determining whether the first task relinquishes control from the second state and is waiting for a resource;
moving the stack pointer back from the second-level stack to the first-level stack if the first task relinquishes itself and awaits for another resource; and
providing the second-level stack for use by a second task.

13. A computer processor and memory running a Real-Time Operating System (RTOS) for the computer processor performing a first plurality of tasks including a first task and a second task, the RTOS comprising:
a task generator configured for creating a plurality of tasks with a two level stack scheme including a first-level stack and a second-level stack; and a task scheduler configured for:
scheduling a first task for execution by moving a stack pointer from the first-level stack to the second-level stack;
determining whether the first task is pre-empted;
allocating the second-level stack to the first task in a second state if the first task is not pre-empted;
changing an active task for execution;
determining whether the first task relinquishes control from the second state and is waiting for a resource;
moving the stack pointer back from the second-level stack to the first-level stack if the first task relinquishes itself and awaits for another resource; and
providing the second-level stack for use by a second task.

* * * * *